United States Patent
Nakami

(10) Patent No.: US 7,130,462 B2
(45) Date of Patent: Oct. 31, 2006

(54) OUTPUT AND STORE PROCESSED IMAGE DATA

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 802 days.

(21) Appl. No.: 10/342,152

(22) Filed: Jan. 13, 2003

(65) Prior Publication Data

US 2003/0185437 A1    Oct. 2, 2003

(30) Foreign Application Priority Data

Jan. 15, 2002   (JP) ............................. 2002-006289

(51) Int. Cl.
*G06K 9/00* (2006.01)
*G06K 9/36* (2006.01)

(52) U.S. Cl. ...................... 382/166; 382/167

(58) Field of Classification Search ............... 382/166, 382/167; 345/590
See application file for complete search history.

(56) References Cited

U.S. PATENT DOCUMENTS 6,388,674 B1 *   5/2002   Ito et al. ...................... 382/166
6,633,668 B1 *  10/2003   Newman ...................... 382/166

* cited by examiner

*Primary Examiner*—Phuoc Tran
(74) *Attorney, Agent, or Firm*—Martine Penilla & Gencarella, LLP

(57) ABSTRACT

When JPEG data is open on a personal computer 10, YCbCr to RGB conversion is carried out. The converted RGB data may include negative color values and color values of and over 256, which are outside of a 0 to 255 color value range in the sRGB color space generally used on the personal computer 10. The negative color values and the color values of and over 256 included in the RGB data are linearly compressed into color values in the 0 to 255 color value range, are subjected to image processing, and are then linearly expanded. This arrangement effectively reduces deterioration of the image processed RGB data relative to the original RGB data.

24 Claims, 8 Drawing Sheets

OUTPUT AND STORE PROCESSED IMAGE DATA

BACKGROUND OF THE INVENTION

The present invention relates to an image processing apparatus that makes image data subjected to image processing. On existing operating systems, the sRGB color space or the standard color space for monitors is used to represent RGB data. When generally used JPEG data is open on a personal computer, for example, the JPEG data is immediately converted into RGB data. The conversion of the JPEG data into the RGB data may give color values outside the color range in the sRGB color space. These color values are not displayable in the sRGB color space and are thus clipped (cut off).

The prior art technique accordingly causes part of the color values in the original JPEG image data to be lost in the course of image processing. The processed image data is kept without restoration of the lost color values. This undesirably leads to deterioration of the JPEG data.

SUMMARY OF THE INVENTION

The object of the present invention is thus to maintain or recover image information included in original image data in the course of image processing and store the maintained or recovered image information again as part of resulting image data.

In order to attain at least part of the above and the other related objects, a first application of the present invention provides an image processing apparatus that makes image data in a predetermined color value range subjected to image processing. The image processing apparatus as the first application of the present invention includes: a first color space conversion unit that converts image data expressed in a first color system into image data in a preset RGB color system; a compression unit that compresses the image data in the preset RGB color system, so that a maximum color value and a minimum color value among color values inside and outside the predetermined color value range are respectively mapped to a maximum value and a minimum value in the predetermined color value range; an image processing unit that makes the compressed image data subjected to the image processing; an expansion unit that expands the processed image data; a second color space conversion unit that converts the expanded image data in the preset RGB color system into image data in the first color system; and an output unit that outputs the converted image data in the first color system.

The image processing apparatus as the first application of the present invention analyzes the image data in the preset RGB color system, and specifies maximum color value and the minimum color value among the color values inside and outside the predetermined color value. The image processing apparatus compresses the image data in the preset RGB color system, so that the specified maximum color value and minimum color values are respectively mapped to the maximum value and the minimum value in the predetermined color value range. The image processing apparatus then makes the compressed image data subjected to the image processing and expands the processed image data. This arrangement desirably enables image information included in original image data to be maintained or restored in the course of image processing and stored again as part of resulting image data. The compression and expansion processes are carried out, based on the specified maximum color value and minimum color value of the image data in the preset RGB color system. This ensures image processing of the image data without any loss of the color values. The compression and expansion processes executed in the first application of the present invention may be linear or non-linear, as long as they are practically reversible.

The image processing apparatus as the first application of the present invention may further include an analysis unit that analyzes the image data in the preset RGB color system and thereby specifies the maximum color value and the minimum color value among the color values inside and outside of the predetermined color value range. One example of the preset RGB color system is sRGB color system.

In the image processing apparatus as the first application of the present invention, the analysis unit specifies a largest value and a smallest value among R components, G components, and B components of color values obtained by the analysis, respectively as the maximum color value and the minimum color value. The compression unit includes: a proportional coefficient calculation unit that calculates a proportional coefficient, based on a difference between the maximum color value and the minimum color value; and a proportional coefficient application unit that uses the calculated proportional coefficient to compress color values of all image data into image data in the predetermined color value range.

The image processing apparatus of the above arrangement effectively reduces or prevents a change in brightness of the image data before and after the compression and the expansion processes. For example, the reversible compression and expansion is attained by determining one proportional coefficient in the case of a linear compression process or by determining multiple proportional coefficients in the case of a non-linear compression process.

In the image processing apparatus as the first application of the present invention, the expansion unit uses the calculated proportional coefficient to expand all the compressed image data. This arrangement enables the processed image data to be accurately restored to uncompressed image data. The image processing apparatus may further include a storage unit that stores the output image data in the first color system. The first color system is, for example, YCbCr color system.

In the image processing apparatus as the first application of the present invention, image processing control information, which specifies an image processing condition in the image processing apparatus, is related to the image data expressed in the first color system. The compression unit carries out the compression, when the image processing control information specifies use of color values outside the predetermined color value range. The output unit outputs the converted image data in the first color system with the image processing control information. This arrangement gives the processed image data related to the image processing control information, after the image processing.

In the image processing apparatus as the first application of the present invention, image processing control information, which specifies an image processing condition in the image processing apparatus, is related to the image data expressed in the first color system. The image processing apparatus further includes: an interpretation unit that interprets the image processing control information; a third color space conversion unit that utilizes a result of the interpretation and converts the image data in the preset RGB color system into image data in a wider RGB color system, which has a color range including color values inside and outside the color range of the preset RGB color system; an image processing unit that utilizes the result of the interpretation and makes the image data in the wider RGB color system subjected to the image processing; and a print image data output unit that outputs the processed image data as print image data. This arrangement ensures execution of the image processing based on the image processing control information.

The first application of the present invention is not restricted to the image processing apparatus, but may be attained by a corresponding method.

A second application of the present invention provides an image processing apparatus that makes image data in a predetermined color value range subjected to image processing. The image processing apparatus as the second application of the present invention includes: a first color space conversion unit that converts image data expressed in a first color system into image data in a preset RGB color system; a compression unit that compresses the image data in the preset RGB color system, so that a predetermined maximum color value and a predetermined minimum color value outside the predetermined color value range are respectively mapped to a maximum value and a minimum value in the predetermined color value range; an image processing unit that makes the compressed image data subjected to the image processing; an expansion unit that expands the processed image data; a second color space conversion unit that converts the expanded image data in the preset RGB color system into image data in the first color system; and an output unit that outputs the converted image data in the first color system.

The image processing apparatus as the second application of the present invention compresses the image data in the preset RGB color system, so that a predetermined maximum color value and a predetermined minimum color value outside the predetermined color value range are respectively mapped to a maximum value and a minimum value in the predetermined color value range. The image processing apparatus then makes the compressed image data subjected to the image processing and expands the processed image data. This arrangement desirably enables image information included in original image data to be maintained or restored in the course of image processing and stored again as part of resulting image data. The compression and expansion processes are carried out, based on the predetermined maximum color value and the predetermined minimum color value. This allows for quick compression and expansion and ensures image processing of the image data without any loss of the color values.

In the image processing apparatus as the second application of the present invention, the predetermined maximum color value may be greater by 50 than the maximum value in the predetermined color value range, and the predetermined minimum color value may be smaller by 50 than the minimum value in the predetermined color value range.

The various arrangements discussed above with regard to the image processing apparatus as the first application of the present invention are also applicable to the image processing apparatus as the second application of the present invention. These arrangements ensure the functions and the effects similar to those of the image processing apparatus as the first application of the present invention. The second application of the present invention is also not restricted to the image processing apparatus, but may be attained by a corresponding method.

A third application of the present invention provides an image processing apparatus. The image processing apparatus as the third application of the present invention includes: a first color space conversion unit that converts image data expressed in a first color system into image data in a preset RGB color system; a second color space conversion unit that converts the image data in the preset RGB color system into image data in a wider RGB color system, which has a color range including color values inside and outside the color range of the preset RGB color system; an image processing unit that makes the image data in the wider RGB color system subjected to image processing; a third color space conversion unit that, in response to a storage request of the processed image data, converts the processed image data in the wider RGB color system into image data in the preset RGB color system; a fourth color space conversion unit that converts the image data in the preset RGB color system into image data in the first color system; and an output unit that outputs the converted image data in the first color system.

The image processing apparatus as the third application of the present invention converts the image data expressed in the first color system into image data in the wider RGB color system, which has a color range including color values inside and outside the color range of the preset RGB color system. The image processing apparatus then makes the image data in the wider RGB color system subjected to image processing, converts the processed image data in the wider RGB color system into image data into the preset RGB color system, and further converts the image data in the preset RGB color system into image data in the first color system. This arrangement enables image data in the first color system to be obtained from the processed image data without any loss of the color values outside the color range of a preset color system.

The image processing apparatus as the third application of the present invention may further include a storage unit that stores the output image data in the first color system. This arrangement enables the resulting image data in the first color system after the image processing to be stored again without any loss of the color values.

In the image processing apparatus as the third application of the present invention, the preset RGB color system may be sRGB color system.

In the image processing apparatus as the third application of the present invention, the image processing apparatus further includes a display image data output unit that converts the color system of the image data, which has been subjected to the image processing in the wider RGB color system, into a color system of a display device and outputs the converted image data to the display device. While the image processing is carried out in the wider RGB color system, this arrangement ensures output of the processed image data in the sRGB color system, which is adequate for the display device, to the display device.

In the image processing apparatus as the third application of the present invention, the image processing apparatus further includes: a display image data output unit that deletes color values outside the color range of the preset RGB color system among the image data in the preset RGB color system and outputs resulting image data as display image data to a display device; and a display image data processing unit that makes the display image data subjected to the image processing executed by the image processing unit. This arrangement desirably simplifies the image processing of the image data, which are output to the display device, and ensures output of the adequate image data to the display device.

The third application of the present invention is also not restricted to the image processing apparatus, but may be attained by a corresponding method.

A fourth application of the present invention provides a computer readable medium that stores therein a program command assembly to make image data in a predetermined color value range subjected to image processing. The program command assembly includes: a program command to convert image data expressed in a first color system into image data in a preset RGB color system; a program command to compress the image data in the preset RGB color system, so that a maximum color value and a minimum color value among color values inside and outside the predetermined color value range are respectively mapped to a maximum value and a minimum value in the predetermined color value range; a program command to make the compressed image data subjected to the image processing; a program command to expand the processed image data; a program command to convert the expanded image data in the preset RGB color system into image data in the first color system; and a program command to output the converted image data in the first color system.

The computer readable medium as the fourth application of the present invention has the functions and the effects similar to those of the image processing apparatus as the first application of the present invention. The various arrangements discussed previously with regard to the image processing apparatus as the first application of the present invention are also applicable to the computer readable medium as the fourth application of the present invention.

A fifth application of the present invention provides a computer readable medium that stores therein a program command assembly to make image data in a predetermined color value range subjected to image processing. The program command assembly includes: a program command to convert image data expressed in a first color system into image data in a preset RGB color system; a program command to compress the image data in the preset RGB color system, so that a predetermined maximum color value and a predetermined minimum color value outside the predetermined color value range are respectively mapped to a maximum value and a minimum value in the predetermined color value range; a program command to make the compressed image data subjected to the image processing; a program command to expand the processed image data; a program command to convert the expanded image data in the preset RGB color system into image data in the first color system; and a program command to output the converted image data in the first color system.

The computer readable medium as the fifth application of the present invention has the functions and the effects similar to those of the image processing apparatus as the second application of the present invention. The various arrangements discussed previously with regard to the image processing apparatus as the second application of the present invention are also applicable to the computer readable medium as the fifth application of the present invention.

A sixth application of the present invention provides a computer readable medium that stores therein a program command assembly for image processing. The program command assembly includes: a program command to convert image data expressed in a first color system into image data in a preset RGB color system; a program command to convert the image data in the preset RGB color system into image data in a wider RGB color system, which has a color range including color values inside and outside the color range of the preset RGB color system; a program command to make the image data in the wider RGB color system subjected to image processing; a program command to, in response to a storage request of the processed image data, convert the processed image data in the wider RGB color system into image data in the preset RGB color system; a program command to convert the image data in the preset RGB color system into image data in the first color system; and a program command to output the converted image data in the first color system.

The computer readable medium as the sixth application of the present invention has the functions and the effects similar to those of the image processing apparatus as the third application of the present invention. The various arrangements discussed previously with regard to the image processing apparatus as the third application of the present invention are also applicable to the computer readable medium as the sixth application of the present invention.

DETAILED DESCRIPTION OF THE PREFERRED EMBODIMENTS

Figure 1:
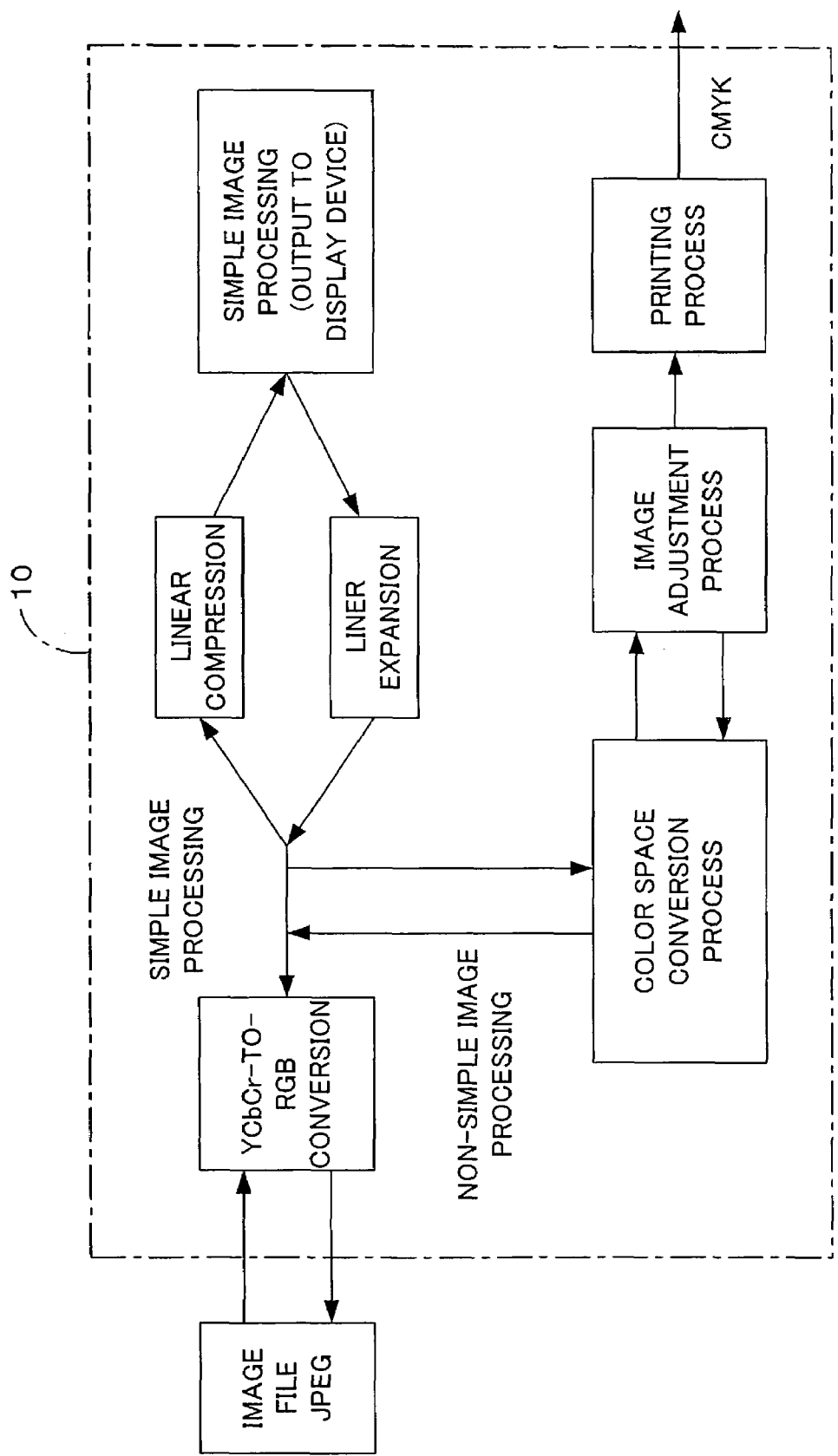
FIG. 1 shows the basic concepts of multiple embodiments according to the present invention.

Preferred embodiments of the present invention are discussed below with reference to the drawings. The description first regards the basic concepts of the respective embodiments according to the present invention with referring to FIG. 1. FIG. 1 shows the basic concepts of the respective embodiments according to the present invention.

For example, when desired image data GD is selected (opened) in an image file GF of a JPEG format on a personal computer, the selected image data GD goes through YCbCr-RGB conversion, which is known to the skilled in the art as S conversion. Such conversion is required, since the image data GD in the JPEG image file are YCbCr data but the data generally processed on the personal computer are RGB data.

The converted RGB data may include negative values and values of and over 256. The RGB data processible on the personal computer have the tones in a range of 1 to 255 (color value range), which are expressed in the sRGB color space (color system) or the standard color space for monitors. Handling the negative color values and the color values of and over 256 included in the RGB data is of great importance, in order to prevent or reduce deterioration of the image data stored again after image processing.

A first embodiment regards a process of handling the negative color values and the color values of and over 256 included in the RGB data, which is suitable for simple image processing without any significant change in value of the image data, for example, red-eye reduction or change in resolution of an image. A second embodiment regards a process of handling the negative color values and the color values of and over 256 included in the RGB data, which is suitable for image processing or printing process with a significant change in value of the image data.

The first embodiment uses the sRGB color space as the color space of image processing. The procedure of the first embodiment compresses the negative color values and the color values of and over 256 included in the RGB data into the color value range of 0 to 255, makes the compressed data subjected to image processing, and expands the processed data. This arrangement effectively reduces deterioration of the processed RGB data (loss of color values) relative to the original RGB data. For simplicity of explanation, linear compression and linear expansion are carried out in the first embodiment. Non-linear compression and non-linear expansion may alternatively be executed, as long as the compression and the expansion are practically reversible.

The second embodiment uses a wRGB color space, which has a wider color range than the color range of the sRGB color space, as the color space of image processing. Even the color values outside the color range of the sRGB color space are within the wider color range of the wRGB color space. The procedure of the second embodiment executes a color space conversion process from the sRGB color space to the wRGB color space, an image adjustment process, and a printing process or a storage process. This arrangement desirably prevents deterioration of the color values of the processed image data, which are stored again after image processing.

A. Image Processing System

Figure 2:
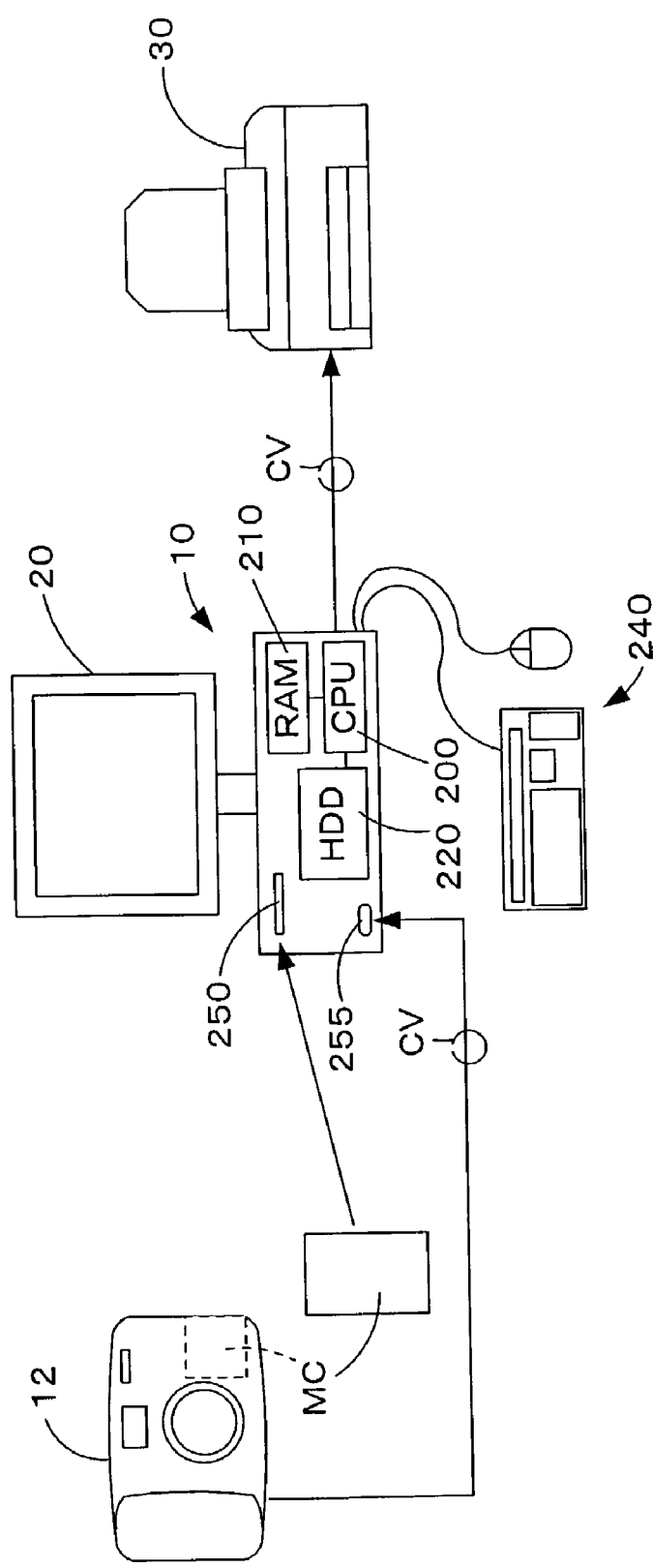
FIG. 2 illustrates a construction of an image processing system, which is applicable to the respective embodiments.

The construction of an image processing system, which is commonly applicable to the respective embodiments, is discussed below with reference to FIG. 2. FIG. 2 illustrates a construction of the image processing system.

The image processing system includes a digital still camera 12 as an input device that generates image data as an object of image processing, a personal computer 10 as an image processing apparatus that makes the image data generated by the still camera 12 subjected to a series of image processing discussed later, and a color printer 30 as an image output device set by the personal computer 10. Image data (image file) subjected to the image processing executed in the image processing apparatus of this embodiment are those input from the digital still camera 12 to the personal computer 10 via a connecting cable CV or a memory card MC.

The image processing apparatus is not restricted to the personal computer 10, but may be, for example, a stand alone-type printer having the functions of image processing. The output device is also not restricted to the printer 30, but may be a display device, such as a CRT display or an LCD display, or a projector.

The personal computer 10 is a general purpose computer and includes a CPU 200 to execute an image processing program of the present invention, a RAM 210 to temporarily store therein results of operations executed by the CPU 200 and image data, a hard disk drive (HDD) 220 to store therein the image processing program, a display device 20, such as a CRT display, to display the results of the operations executed by the CPU 200 and the image data, and an input device 240, such as a keyboard and a mouse, to input commands and numeral values. The personal computer 10 also has a card slot 250 to receive the memory card MC inserted therein, and an input-output terminal 255 to connect with the connecting cable CV from, for example, the digital still camera 12.

Image data GD generated by the digital still camera 12 generally have a data structure in conformity with an exchangeable image file format (Exif) for digital still cameras. The specification of the Exif is set by Japan Electronics and Information Technology Industries Association (JEITA).

Figure 3:
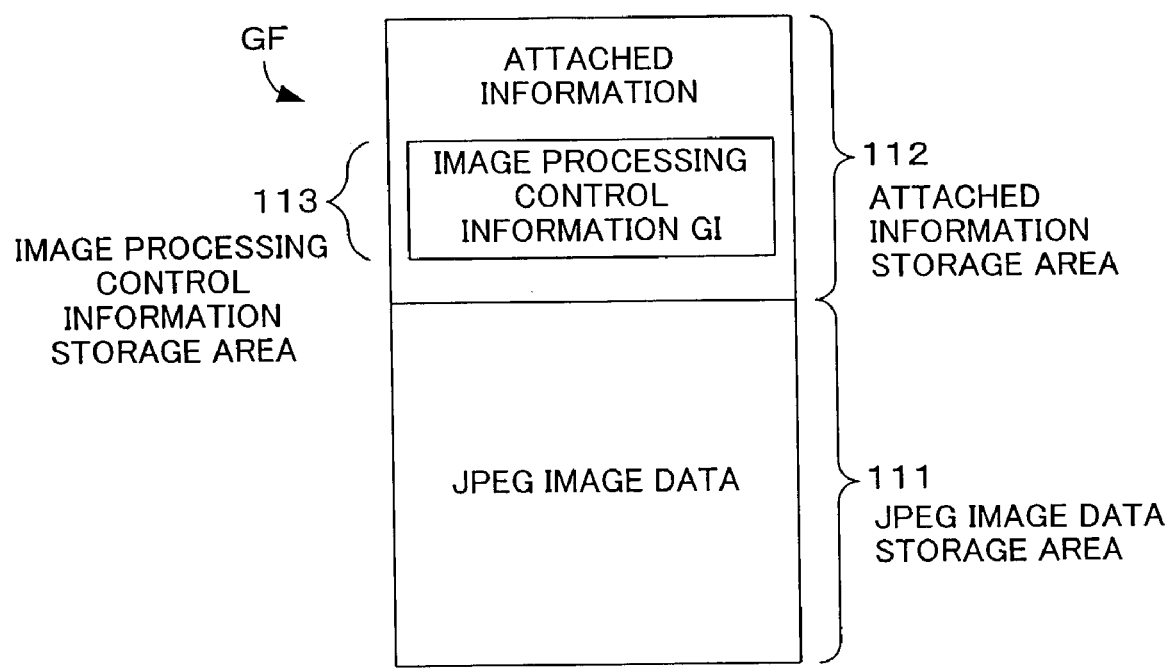
FIG. 3 schematically illustrates the internal structure of an image file GF stored in an Exif file form.

The internal structure of an image file in the Exif file format is discussed with reference to FIG. 3. FIG. 3 schematically illustrates the internal structure of an image file GF stored in the Exif file format. The terms 'file structure', 'data structure', and 'storage area' in this embodiment are used to represent a file or data in the state of storage in a memory device.

The Exif image file GF has a JPEG image data storage area 111 to store JPEG image data and an attached information storage area 112 to store various pieces of attached information relating to the stored JPEG image data. Photographing information relating to photographing conditions of JPEG images, such as the color space at a photographing time, the date and time of photographing, the exposure, and the shutter speed, and thumbnail image data of JPEG images kept in the JPEG image data storage area 111 are stored in a TIFF format in the attached information storage area 112. The attached information is automatically stored in the attached information storage area 112, when image data is written into the memory card MC. In the structure of this embodiment, the attached information storage area 112 has an image processing control information storage area 113 to store image processing control information GI, which is used to control the series of image processing executed in the personal computer 10. The image processing control information GI includes information for determining whether or not color values outside the color value range of the sRGB color space used in the first embodiment are to be deleted (clipped off).

B. First Embodiment

Figure 4:
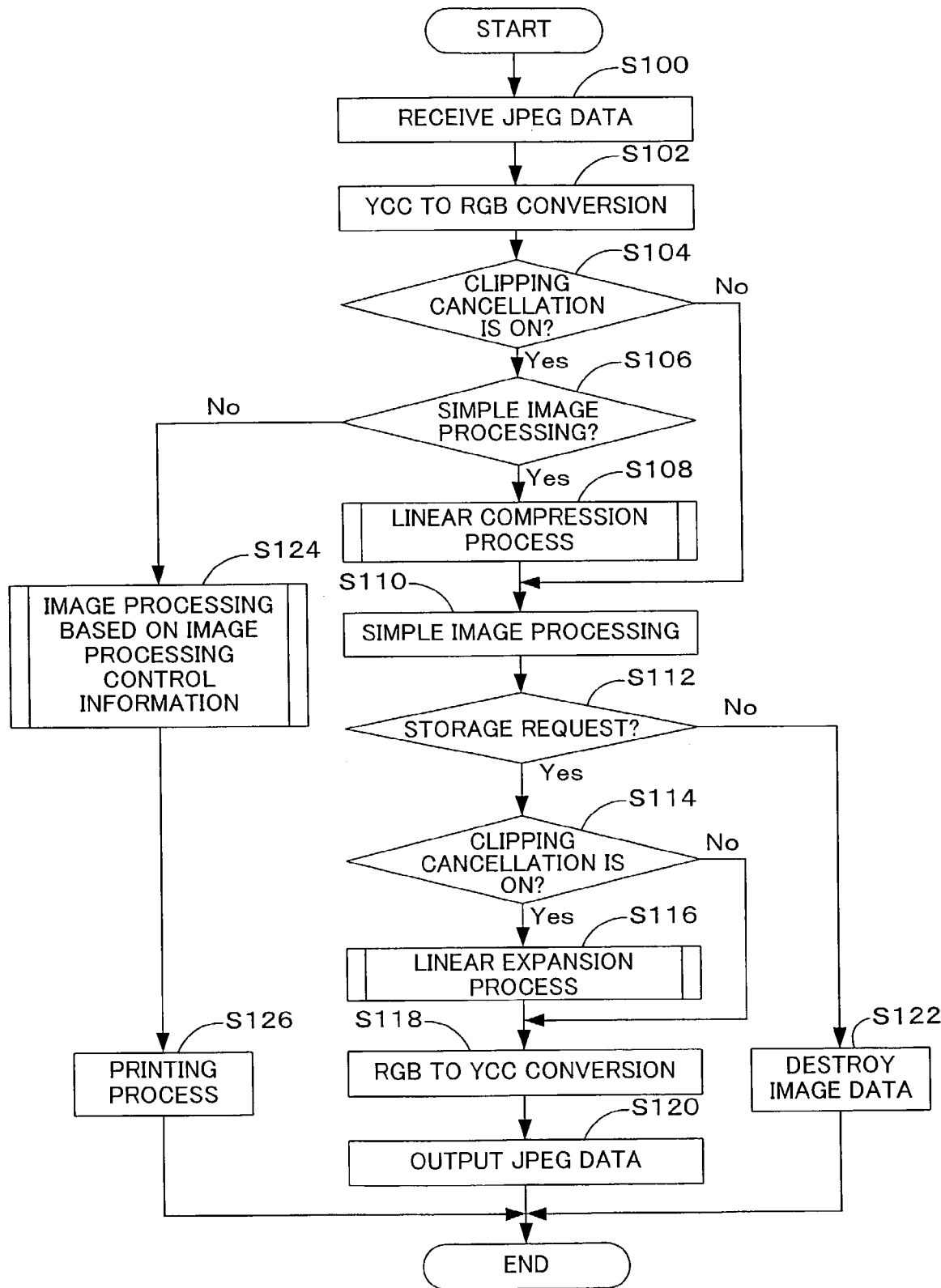
FIG. 4 is a flowchart showing an image processing routine executed in a first embodiment.
Figure 5:
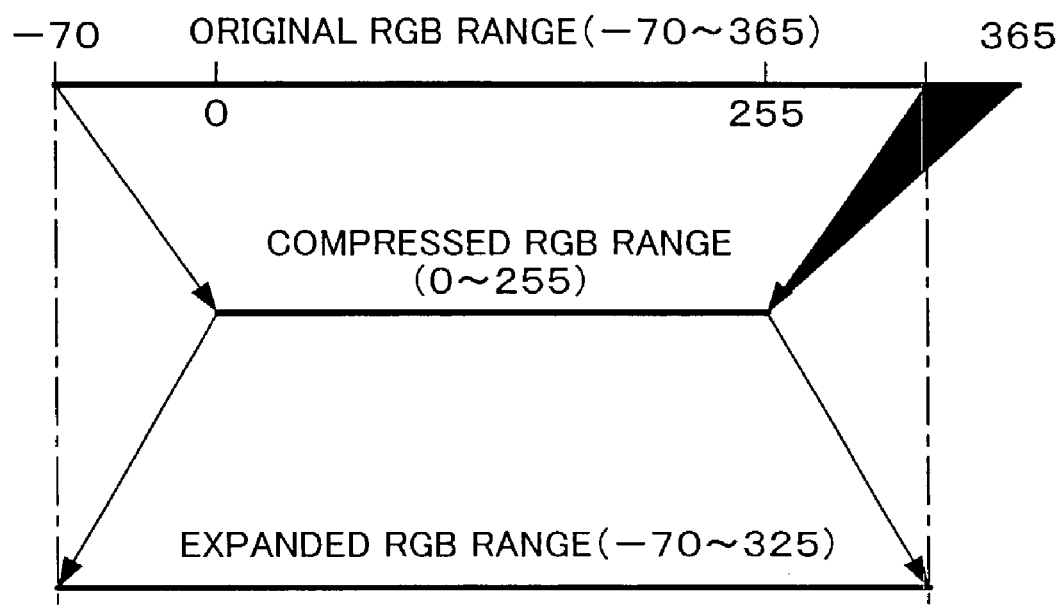
FIG. 5 shows the concepts of linear compression and linear expansion in a first application of the first embodiment.
Figure 6:
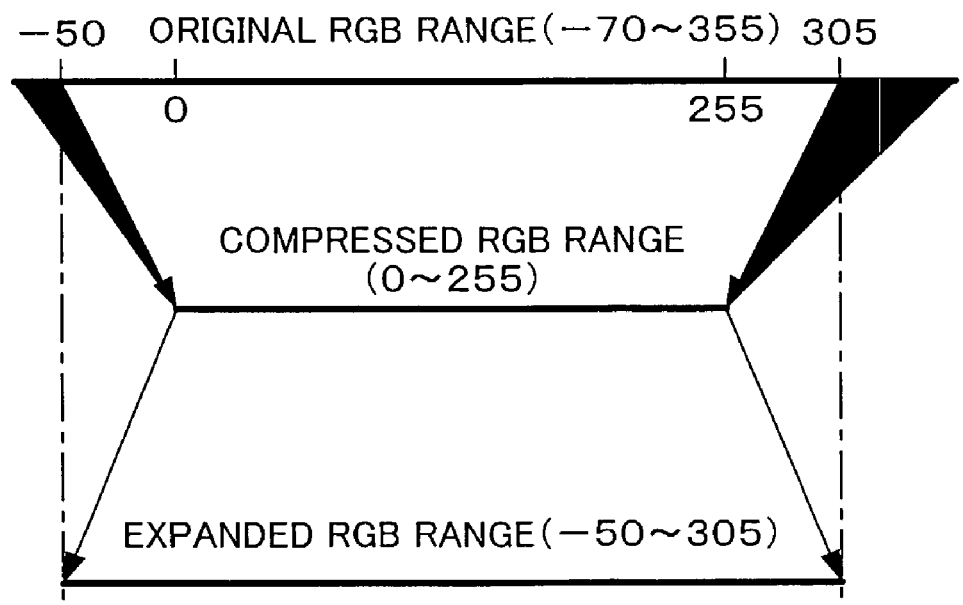
FIG. 6 shows the concepts of linear compression and linear expansion in a second application of the first embodiment.

The first embodiment is discussed below with reference to FIGS. 4 to 6. FIG. 4 is a flowchart showing an image processing routine executed in the first embodiment. FIG. 5 shows the concepts of linear compression and linear expansion in a first application of the first embodiment. FIG. 6 shows the concepts of linear compression and linear expansion in a second application of the first embodiment.

This image processing routine starts, in response to selection (opening) of desired JPEG image data after activation of the application program or in response to activation of the application program by selection (opening) of desired JPEG image data. As mentioned previously, the image processing control information GI is stored in each image file including image data.

The CPU 200 of the personal computer 10 receives the selected JPEG image data (step S100), and carries out conversion from YCbCr (YCC) data into RGB data expressed in the sRGB color space (step S102). As is well known to the skilled in the art, matrix operation using an S matrix is applied for conversion from YCC data into RGB data.

The CPU 200 then determines whether or not a clipping cancellation function is set ON in the image processing control information GI to given an instruction of using color values outside the color value range of 0 to 255 in the sRGB color space processible by the CPU 200 (step S104). The converted RGB image data may have negative color values and color values of and over 256, because of negative values included in the S matrix or another reason.

When it is determined that the clipping cancellation function is not set ON (step S104: No), the CPU 200 cuts off the color values outside the color value range of 0 to 255 processible by the CPU 200 and carries out simple image processing, such as red-eye reduction or change in resolution of the image.

When it is determined that the clipping cancellation function is set ON (step S104: Yes), on the other hand, the CPU 200 determines whether or not the required processing is simple image processing without any significant change in value of image data GD, such as red-eye reduction, change in resolution of the image, or trimming (step S106). When image processing causes a significant change in value of linearly compressed image data GD', linear expansion with the information of linear compression may not correctly expand the values of the compressed image data GD'.

When it is determined that the required processing is simple image processing (step S108: Yes), the CPU 200 carries out linear compression of the image data (step S108). According to a linear compression process in a first application of the first embodiment, the CPU 200 analyzes color values (R, G, B) of respective pixels included in the image data GD and specifies a minimum color value min(R, G, B) having a minimum R, G, or B value and a maximum color value max(R, G, B) having a maximum R, G, or B vlaue.

The CPU 200 calculates a maximum value difference (max−255) between the maximum color value max(R, G, B) and the maximum value 255 in the preset color value range and a minimum value difference (0−min) between the minimum color value min(R, G, B) and the minimum value 0 in the preset color value range, and applies the smaller between the maximum value difference and the minimum value difference to the maximum color value max(R, G, B) and the minimum color value min(R, G, B). Setting different values to the maximum value difference and the minimum value difference leads to a variation in brightness of the linearly compressed image data. The variation in brightness causes a difference between the brightness of an image output on the display device 20 and the brightness of an image output by the printer 20, which makes the user feel odd. The above operation desirably prevents such potential problems.

In the example of FIG. 5, the preset color value range is 0 to 255, while the original RGB range is −70 to 365. In this example, the maximum color value max(R, G, B)=365, the minimum color value min(R, G, B)=−70, the maximum value difference=110, and the minimum value difference=70. The resulting settings are accordingly the maximum color value max(R, G, B)=325 and the minimum color value min(R, G, B)=−70. Namely the color values in the range of 326 to 365 are cut off and are clipped to 325.

The CPU 200 subsequently calculates a proportional coefficient K from the maximum color value max(R, G, B) and the minimum color value min(R, G, B) and applies Equations (1) to (3) given below to the color values of the respective pixels included in the image data GD. This operation causes the color values (R, G, B) of the image data GD in the range of −70 to 365 to be linearly compressed into the preset color value range 0 to 255, and thereby gives color values (R', G', B') of converted image data GD'. The method of specifying (setting) multiple proportional coefficients attains reversibility of non-linear compression and expansion, as in the case of linear compression and expansion.

$$R'=(R+\min(R,G,B))\times K \quad \text{Equation (1)}$$

$$G'=(G+\min(R,G,B))\times K \quad \text{Equation (2)}$$

$$B'=(B+\min(R,G,B))\times K \quad \text{Equation (3)}$$

$$K = \frac{255}{\max(R, G, B) - \min(R, G, B)}$$

The CPU 200 makes the linearly compressed image data GD' subjected to the required simple image processing, such as red-eye reduction, trimming, or change in resolution of the image (step S110). The red-eye reduction changes the color values in part of the image data from red color to black eye color. Neither the trimming nor the change in resolution of the image accompanies any change in color value of the image data.

The CPU 200 then determines whether or not there is a storage request (step S112). When there is a storage request (step S112: Yes), the CPU 200 determines whether or not the clipping cancellation function is set ON in the image processing control information (step S114). When it is determined that the clipping cancellation function is not set ON (step S114: No), the CPU 200 skips a linear expansion process and proceeds to step S118.

When it is determined that the clipping cancellation function is set ON (step S114: Yes), on the other hand, the CPU 200 carries out the linear expansion process to convert the compressed image data GD' into an uncompressed state (step S116). According to the linear expression process, the CPU 200 applies the maximum color value max(R, G, B) and the minimum color value min(R, G, B), which have been used in the linear compression process, to Equations (4) to (6) given below, and expands the compressed image data GD' in an inverse direction to the compressing direction, so as to obtain uncompressed image data GD". In Equations given below, Rm', Gm', and Bm' represent RGB color values after the simple image processing, and Rm, Gm, and Bm represent RGB color values after the linear expansion.

$$Rm = \left(Rm' - \min(R, G, B)\times \frac{1}{K}\right) \quad \text{Equation (4)}$$

$$Gm = \left(Gm' - \min(R, G, B)\times \frac{1}{K}\right) \quad \text{Equation (5)}$$

$$Bm = \left(Bm' - \min(R, G, B)\times \frac{1}{K}\right) \quad \text{Equation (6)}$$

As shown in FIG. 5, the compressed image data GD' are converted into the uncompressed image data GD" having an expanded RGB range (−70 to 325) by the CPU 200. This procedure can not restore all of the original RGB range (−70 to 365), but enables a significantly greater number of color values to be restored, compared with the prior art procedure that simply cuts off the color values outside the preset color value range (0 to 255).

The CPU 200 subsequently carries out inverse matrix operation using the S matrix and converts the uncompressed RGB image data GD" into YCbCr data (step S118). The CPU 200 further converts the YCbCr data into JPEG data and outputs the resulting JPEG data (step S120). The CPU 200 then exits from this processing routine. The resulting JPEG image data GD is output together with information identical with the image processing control information GI, which is attached to the original image data GD as the object of image processing. This arrangement allows for storage of the processed image file GF having the image processing control information GI in the same format as that of the original image file GF having the image processing control information GI.

When there is no storage request (step S112: No), the CPU 200 destroys the image data GD' (step S122) and exits from this processing routine.

When it is determined that the required processing is not simple image processing (step S106: No), the CPU 200 executes image processing based on the image processing control information GI (step S124), and carries out printing (step S126). The CPU 200 then exits from this processing routine. This printing process is only an example of the image processing other than the simple image processing.

As described above, when the RGB data converted from the JPEG (YCbCr) data include the color values outside the color value range of 0 to 255 in the sRGB color space (the preset color value range), the procedure of the first embodiment linearly compresses the color values of the image data outside the preset color value range into the preset color value range and restores the compressed image data to uncompressed image data by the linear expansion. This arrangement enables the color values of the image data outside the preset color value range to be adequately restored after the simple image processing in the sRGB color space, which is generally used in the personal computer 10.

The procedure of linear compression analyzes the image data, specifies the maximum color value (R, G, B) and the minimum color value (R, G, B), and carries out linear compression of the image data based on the specified maximum color value (R, G, B) and minimum color value (R, G, B). This arrangement enables the linear compression and the linear expansion to be executed according to the individual image data, thus ensuring adequate restoration of the color values of the original color data and reducing deterioration of the restored RGB data (loss of color values).

Linear processing is applied for both compression of the image data into the preset color value range and expansion from the preset color value range. This arrangement desirably speeds up the compression and expansion processes and minimizes deterioration of the color values.

The arrangement of the first embodiment is advantageous even in the case of simply opening JPEG data without any image processing, that is, in the case of conversion from the JPEG data into RGB data. The procedure of this embodiment is thus significantly advantageous over the prior art procedure that, in the case of simply opening JPEG data, deletes color values outside the color range of the sRGB color space and stores the JPEG data again without part of the original color values.

The procedure of the first embodiment enables the simple image processing, such as trimming, red-eye reduction, or change in resolution of the image, which is frequently performed by the user of JPEG data and is generally not controlled by the image processing control information GI, to be carried out without any significant deterioration of the image data GD. The processed image data are output (stored) with the image processing control information GI. The processed image data is accordingly related again to the image processing control information GI.

A second application of the first embodiment, that is, another application of linear compression and linear expansion, is discussed below with reference to FIG. 6. The procedure of the first application analyzes the image data GD and dynamically specifies the maximum color value max(R, G, B) and the minimum color value min(R, G, B). The procedure of the second application, on the other hand, uses a predetermined maximum color value max(R, G, B) and a predetermined minimum color value min(R, G, B).

For example, the predetermined maximum color value max(R, G, B)=305 and the predetermined minimum color value min(R, G, B)=−50. In the example of FIG. 6, the preset color value range is 0 to 255, and the original RGB range is −70 to 355. In this example, the linear compression process cuts off and clips the color values in the range of −51 to −70 and in the range of 306 to 355 to the value of 0 and the value of 255, respectively.

The linear expansion process expands the color value range, which has been compressed to the range of 0 to 255 by the linear compression process, to the range of −50 to 305. This arrangement ensures restoration of the color values of the original image data GD in the range of 0 to −50 and in the range of 256 to 305, while cutting off the color values in the range of −51 to −70 and in the range of 306 to 355. In general, only little color values are significantly deviated from the preset color value range. The procedure of the second application thus enables the compressed image data GD' to be expanded with less deterioration of the image quality.

The procedure of the second application uses the predetermined maximum color value max(R, G, B) and the predetermined minimum color value min(R, G, B) and does not set the optimal maximum color value max(R, G, B) or the optimal minimum color value min(R, G, B) according to the individual image data. Adequate settings of the predetermined maximum color value max(R, G, B) and the predetermined minimum color value min(R, G, B) in such a manner as to be not significantly deviated from the preset color value range, however, effectively prevent a decrease in contrast of the image data GD' and reduce the difference between an output image on the display device 20 and an output image from the printer 30 or even make the output image on the display device 20 practically identical with the output image from the printer 30. The predetermined maximum color value max(R, G, B) and the predetermined minimum color value min(R, G, B) may be inversely calculated from the reproducible color range of the printer.

The compression and expansion process of the second application is effectively applied for raster processing of image data, where it is generally difficult to specify the maximum color value max(R, G, B) and the minimum color value min(R, G, B) of the image data GD. The arrangement of the second application eliminates the time required for analysis of the image data from the total processing time, thus ensuring higher-speed compression and expansion of the image data.

C. Second Embodiment

Figure 7:
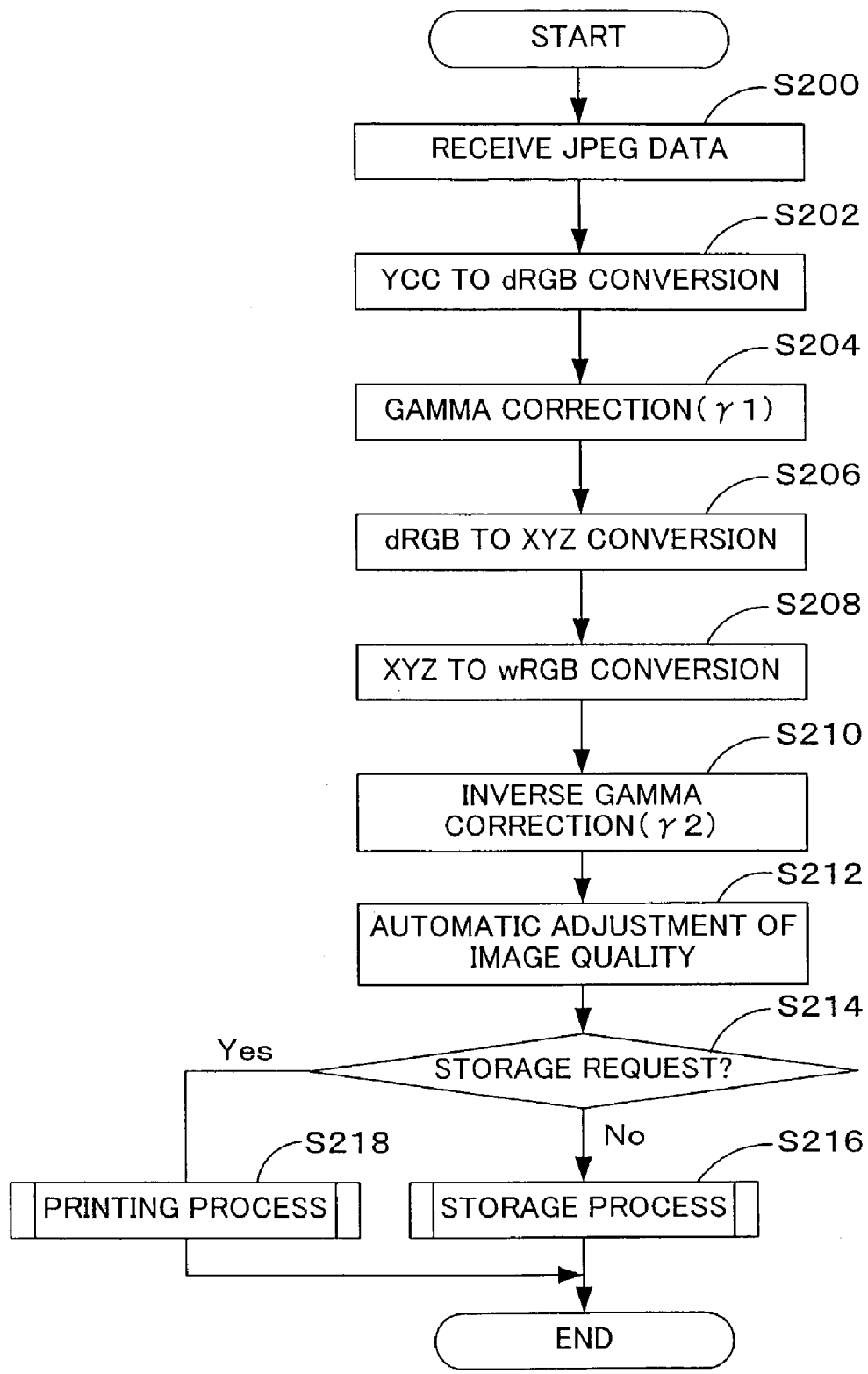
FIG. 7 is a flowchart showing an image processing routine executed in a second embodiment.
Figure 8:
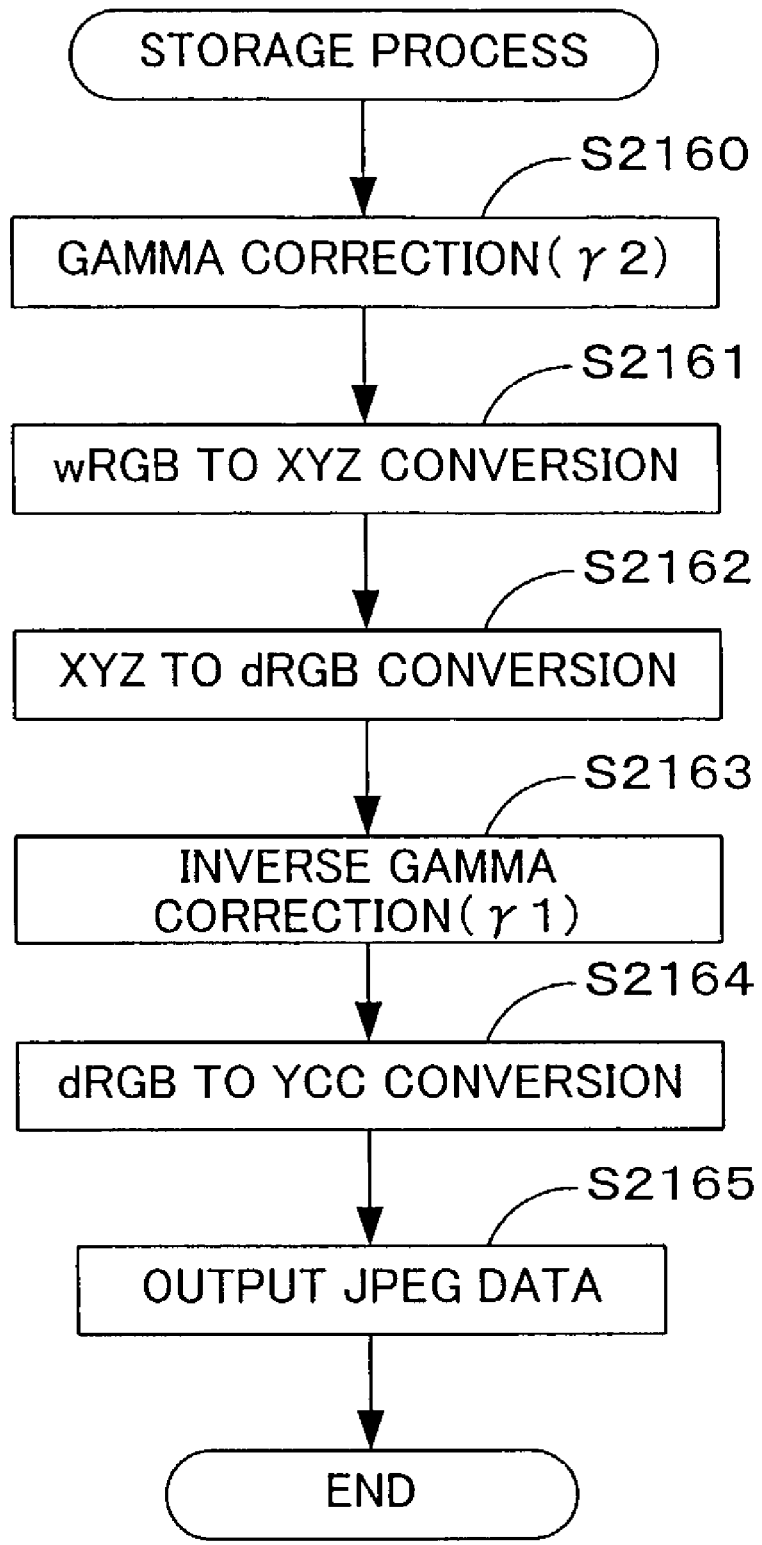
FIG. 8 is a flowchart showing a routine of storing image data executed in the second embodiment.
Figure 9:
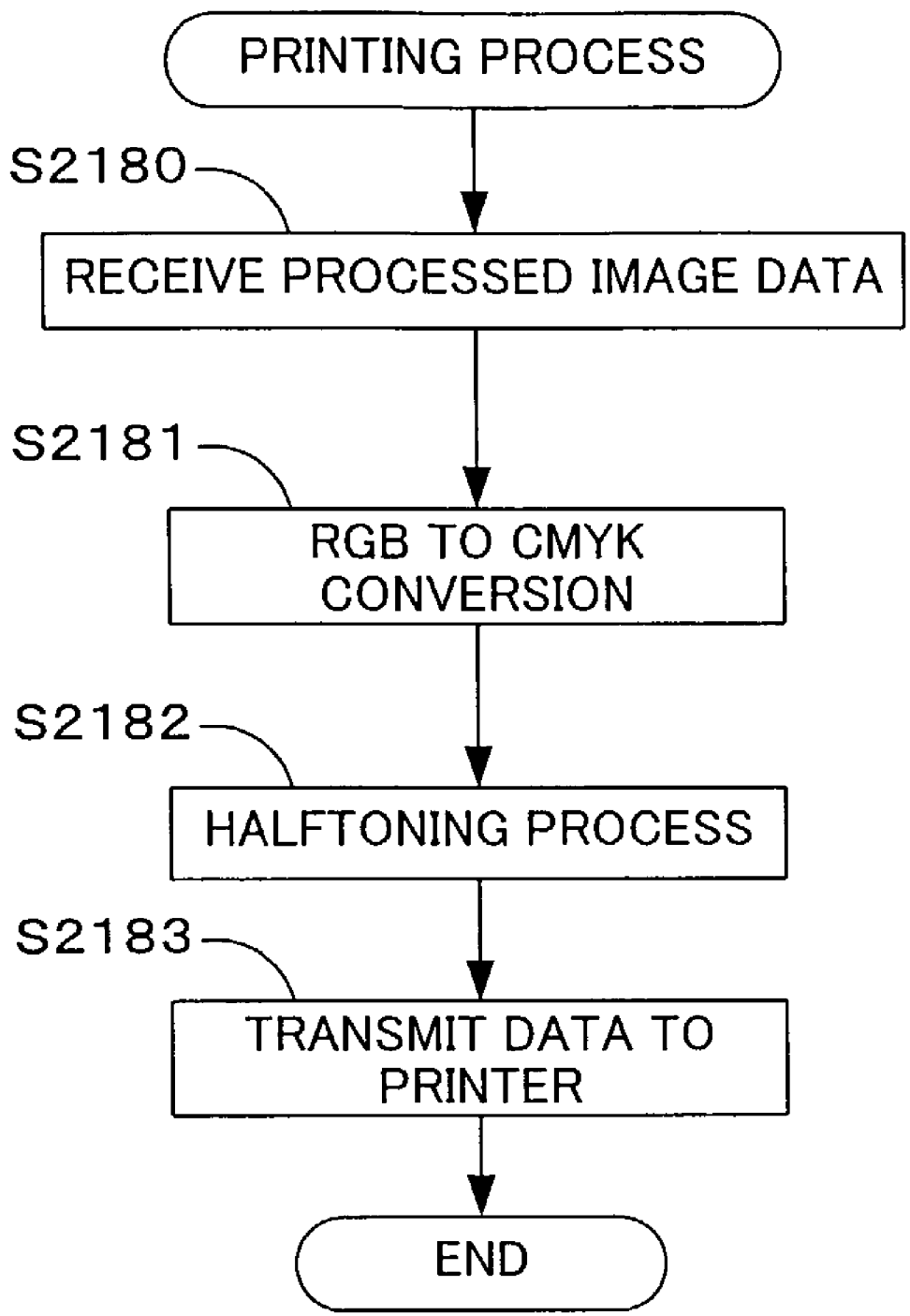
FIG. 9 is a flowchart showing a routine of creating print data executed in the second embodiment.

A second embodiment of the present invention is discussed below with reference to FIGS. 7 through 9. FIG. 7 is a flowchart showing an image processing routine executed in the second embodiment. FIG. 8 is a flowchart showing a routine of storing image data executed in the second embodiment. FIG. 9 is a flowchart showing a routine of creating print data executed in the second embodiment.

The procedure of the second embodiment does not make the color value range of the input image data GD fitted to the preset color value range, in which image processing is executed, but makes the color value range of the color space, in which image processing is executed, fitted to the color value range of the input image data GD, in order to solve the problem of deteriorating image quality arising in the process of storing the processed image data again. As mentioned previously, the image processing system that executes a series of image processing in the second embodiment has the identical structure with that of the image processing system of the first embodiment.

This image processing routine starts, in response to selection (opening) of desired JPEG image data after activation of the application program or in response to activation of the application program by selection (opening) of desired JPEG image data. As mentioned previously, the image processing control information GI is stored in each image file including image data.

The CPU 200 of the personal computer 10 receives the selected JPEG image data (step S200), and carries out conversion from YCbCr (YCC) data into dRGB data, which represent RGB data of the digital still camera 12 (step S202). As is well known to the skilled in the art, matrix operation using an S matrix is applied for conversion from YCC data into dRGB data.

The CPU 200 subsequently carries out gamma correction of the dRGB data with a γ correction value γ1 of the digital still camera 12 specified by the image processing control information GI (step S204) and converts the corrected dRGB data into XYZ data (step S206). The CPU 200 further converts the XYZ data into wRGB data (step S208) and carries out reverse gamma correction of the wRGB data with a γ correction value γ2 of the printer 30 specified by the image processing control information GI (step S210). The wRGB color space has a wider color range than the color range of the sRGB color space, and enables the negative color values and the color values of and over 256 in the sRGB color space to be included in its color range (in a range of 0 to 255 in the case of 256 tones). This arrangement accordingly does not require compression and expansion of the dRGB data.

This series of processing linearizes the input-output characteristics of the image data, executes color matching, converts the color space used to express the image data from the dRGB color space to the wRGB color space, and corrects the linearized input-output characteristics of the image data according to the output characteristics of the printer. The conversion of the color space is carried out by matrix operation using a preset matrix. The gamma correction is carried out with a gamma correction table, which is dynamically created for each image data.

The CPU 200 then automatically adjusts the image quality of the wRGB data based on the image processing control information GI (step S212) and determines whether or not a subsequent request of processing is a storage request (step S214). Automatic adjustment of the image quality based on the image processing control information GI means that the parameters for adjustment of the image quality are specified by the image processing control information GI and that adjustment of the image quality is carried out without user's input of the parameters. The parameters for adjustment of the image quality can, however, be set arbitrarily by the user.

When it is determined that the subsequent request of processing is a storage request (step S214: Yes), the CPU 200 carries out a storage process (step S216) and then exits from this processing routine.

The storage process is discussed in detail with reference to FIG. 8. The CPU 200 first carries out gamma correction of processed image data GD', which represent wRGB data subjected to the adjustment of the image quality (image processing), with the value γ2 (step S2160), so as to linearize the input-output characteristics of the image data GD'. The CPU 200 then converts the wRGB data into XYZ data (step S2161) and further converts the XYZ data into dRGB data (step S2162). This color space conversion is also carried out by matrix operation.

The CPU 200 then carries out inverse gamma correction of the converted dRGB data with the value γ1 (step S2163) and executes inverse matrix operation with the matrix S to convert the dRGB data into YCbCr data (step S2164). The CPU 200 further converts the YCbCr data into JPEG data and outputs the resulting JPEG data (step S2165). The CPU then exits from this processing routine. The resulting JPEG image data GD is output together with information identical with the image processing control information GI, which is attached to the original image data GD as the object of image processing. This arrangement allows for storage of the processed image file GF having the image processing control information GI in the same format as that of the original image file GF having the image processing control information GI.

The printing process is discussed in detail with reference to FIG. 9. The CPU 200 first receives the processed image data GD' subjected to the adjustment of the image quality (step S2180) and converts the wRGB data into CMYK data (step S2181). A preset three-dimensional lookup table for wRGB to CMYK conversion may be used to convert the wRGB data into the CMYK data.

The CPU 200 subsequently carries out halftoning of the converted CMYK data (step S2182) to create print data and transmits the created print data to the printer 30 (step S2183). The CPU 200 then exits from this processing routine.

The procedure of the second embodiment carries out the image processing in the wRGB color space. The wRGB color space is the extended RGB color space having the color range that includes the color values outside the color range of the sRGB color space. Even in the case of image processing with a significant change in color value of the image data, inverse conversion from the wRGB color space into the sRGB color space gives the sRGB data including the color values outside its color range.

When the color values of non-processed sRGB data outside the color range of the sRGB color space are not changed by image processing, the color values of the non-processed sRGB data outside the color range of the sRGB color space are maintained in the processed sRGB data.

The processed image data GD with the image processing control information GI attached thereto are output as the image file GF. The processed image file GF may thus be specified again as the object of image processing with the image processing control information GI.

D. Other Embodiments

The procedure of the first embodiment uses the image file GF having the image processing control information GI and determines whether or not the clipping cancellation function is set ON. The technique of the first embodiment is also applicable to an image file GF without the image processing control information GI. Even in the absence of the image processing control information GI, the RGB data converted from the JPEG data may have color values outside the preset color value range.

When the required processing is not the simple image processing, the procedure of the first embodiment carries out the printing process after the image processing based on the image processing control information Gl. The storage process, instead of the printing process, may be carried out as discussed in the second embodiment. The procedures of the respective embodiments are discussed separately for the purpose of clarifying their characteristics and advantages, but may be combined with each other by a step of discriminating simple image processing from other image processing.

In the above embodiments, the digital still camera 12 is used as the photographing device. Other devices, such as a scanner and a digital video camera, may also be applicable for the photographing device. The output device is not restricted to the printer, but may be a liquid crystal display, a CRT display, a projector, or the like.

In the above embodiments, the image file GF has the Exif format. This format of the image file is not restrictive at all, but the technique of the present invention is applicable to image files of other formats created by an image file creation device. The image file is just required to include both the image data to be output by the output device and the image processing control information GI for specifying the image processing conditions of the image data in the image processing apparatus. The image file creation device generates such image files including both the image data and the image processing control information GI.

The image file GF having the image data and the image processing control information GI may be an image file that has mapping data used to relate the image data GD to the image processing control information GI and includes the image data and the image processing control information GI stored in separate files. In the course of image processing, the image data is related to the image processing control information GI with reference to the mapping data. In this structure, the image data and the image processing control information GI are stored in separate files. At the time of image processing that utilizes the image processing control information GI, however, the image data and the image processing control information are inseparably related to each other and substantially function as an integral file. The image file GF of the above embodiments may be any image file, in which the image data is related to the image processing control information GI at least in the course of image processing. The image file GF may be any of video files stored in optical disk media including CD-ROMs, CD-Rs, DVD-ROMs, and DVD-RAMs.

The embodiments described above use the digital still camera 12. A scanner, a digital video camera, or the like may be used as the input device, instead of the digital still camera 12. Namely the image file GF may be generated by an input device (image file creation device), such as a digital video camera (DVC) or a scanner, in addition to a digital still camera (DSC). The digital video camera generates, for example, image files including still image data and output control information or video image files including video image data in an MPEG format or the like and output control information. In the case of the video image files, the output of all or part of the frames of moving images is under control according to the output control information.

The image processing method, the computer readable medium in which the image processing program commands are stored, and the image processing apparatus of the present invention are described in detail with reference to the embodiments. These embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An image processing apparatus that makes image data in a predetermined color value range subjected to image processing, said image processing apparatus comprising:
    a first color space conversion unit that converts image data expressed in a first color system into image data in a preset RGB color system;
    a compression unit that compresses the image data in the preset RGB color system, so that a maximum color value and a minimum color value among color values inside and outside the predetermined color value range are respectively mapped to a maximum value and a minimum value in the predetermined color value range;
    an image processing unit that makes the compressed image data subjected to the image processing;
    an expansion unit that expands the processed image data;
    a second color space conversion unit that converts the expanded image data in the preset RGB color system into image data in the first color system; and
    an output unit that outputs the converted image data in the first color system.

2. An image processing apparatus in accordance with claim 1, said image processing apparatus further comprising:
    an analysis unit that analyzes the image data in the preset RGB color system and thereby specifies the maximum color value and the minimum color value among the color values inside and outside of the predetermined color value range.

3. An image processing apparatus in accordance with claim 2, wherein the preset RGB color system is sRGB color system.

4. An image processing apparatus in accordance with claim 3, wherein said analysis unit specifies a largest value and a smallest value among R components, G components, and B components of color values obtained by the analysis, respectively as the maximum color value and the minimum color value, and
    said compression unit comprises:
    a proportional coefficient calculation unit that calculates a proportional coefficient, based on a difference between the maximum color value and the minimum color value; and
    a proportional coefficient application unit that uses the calculated proportional coefficient to compress color values of all image data into image data in the predetermined color value range.

5. An image processing apparatus in accordance with claim 4, wherein said expansion unit uses the calculated proportional coefficient to expand all the compressed image data.

6. An image processing apparatus in accordance with claim 1, said image processing apparatus further comprising:
    a storage unit that stores the output image data in the first color system.

7. An image processing apparatus in accordance with claim 1, wherein image processing control information, which specifies an image processing condition in said image processing apparatus, is related to the image data expressed in the first color system,
    said compression unit carries out the compression, when the image processing control information specifies use of color values outside the predetermined color value range, and said output unit outputs the converted image data in the first color system with the image processing control information.

8. An image processing apparatus in accordance with claim 1, wherein image processing control information, which specifies an image processing condition in said image processing apparatus, is related to the image data expressed in the first color system, said image processing apparatus further comprising:
an interpretation unit that interprets the image processing control information;
a third color space conversion unit that utilizes a result of the interpretation and converts the image data in the preset RGB color system into image data in a wider RGB color system, which has a color range including color values inside and outside the color range of the preset RGB color system;
an image processing unit that utilizes the result of the interpretation and makes the image data in the wider RGB color system subjected to the image processing; and
a print image data output unit that outputs the processed image data as print image data.

9. An image processing apparatus that makes image data in a predetermined color value range subjected to image processing, said image processing apparatus comprising:
a first color space conversion unit that converts image data expressed in a first color system into image data in a preset RGB color system;
a compression unit that compresses the image data in the preset RGB color system, so that a predetermined maximum color value and a predetermined minimum color value outside the predetermined color value range are respectively mapped to a maximum value and a minimum value in the predetermined color value range;
an image processing unit that makes the compressed image data subjected to the image processing;
an expansion unit that expands the processed image data;
a second color space conversion unit that converts the expanded image data in the preset RGB color system into image data in the first color system; and
an output unit that outputs the converted image data in the first color system.

10. An image processing apparatus in accordance with claim 9, wherein the preset RGB color system is sRGB color system.

11. An image processing apparatus in accordance with claim 10, wherein the predetermined maximum color value is greater by 50 than the maximum value in the predetermined color value range, and the predetermined minimum color value is smaller by 50 than the minimum value in the predetermined color value range.

12. An image processing apparatus in accordance with claim 9, said image processing apparatus further comprising:
a storage unit that stores the output image data in the first color system.

13. An image processing apparatus in accordance with claim 9, wherein image processing control information, which specifies an image processing condition in said image processing apparatus, is related to the image data expressed in the first color system, said image processing apparatus further comprising:
an interpretation unit that interprets the image processing control information;
a third color space conversion unit that utilizes a result of the interpretation and converts the image data in the preset RGB color system into image data in a wider RGB color system, which has a color range including color values inside and outside the color range of the preset RGB color system;
an image processing unit that utilizes the result of the interpretation and makes the image data in the wider RGB color system subjected to the image processing; and
a print image data output unit that outputs the processed image data as print image data.

14. An image processing apparatus, comprising:
a first color space conversion unit that converts image data expressed in a first color system into image data in a preset RGB color system;
a second color space conversion unit that converts the image data in the preset RGB color system into image data in a wider RGB color system, which has a color range including color values inside and outside the color range of the preset RGB color system;
an image processing unit that makes the image data in the wider RGB color system subjected to image processing;
a third color space conversion unit that, in response to a storage request of the processed image data, converts the processed image data in the wider RGB color system into image data in the preset RGB color system;
a fourth color space conversion unit that converts the image data in the preset RGB color system into image data in the first color system; and
an output unit that outputs the converted image data in the first color system.

15. An image processing apparatus in accordance with claim 14, said image processing apparatus further comprising:
a storage unit that stores the output image data in the first color system.

16. An image processing apparatus in accordance with claim 14, wherein the preset RGB color system is sRGB color system.

17. An image processing apparatus in accordance with claim 14, said image processing apparatus further comprising:
a display image data output unit that converts the color system of the image data, which has been subjected to the image processing in the wider RGB color system, into a color system of a display device and outputs the converted image data to said display device.

18. An image processing apparatus in accordance with claim 14, said image processing apparatus further comprising:
a display image data output unit that deletes color values outside the color range of the preset RGB color system among the image data in the preset RGB color system and outputs resulting image data as display image data to a display device; and
a display image data processing unit that makes the display image data subjected to the image processing executed by said image processing unit.

19. A computer readable medium that stores therein a program command assembly to make image data in a predetermined color value range subjected to image processing, said program command assembly comprising:
a program command to convert image data expressed in a first color system into image data in a preset RGB color system;
a program command to compress the image data in the preset RGB color system, so that a maximum color value and a minimum color value among color values inside and outside the predetermined color value range are respectively mapped to a maximum value and a minimum value in the predetermined color value range;

a program command to make the compressed image data subjected to the image processing;

a program command to expand the processed image data;

a program command to convert the expanded image data in the preset RGB color system into image data in the first color system; and a program command to output the converted image data in the first color system.

20. A computer readable medium that stores therein a program command assembly to make image data in a predetermined color value range subjected to image processing, said program command assembly comprising:

a program command to convert image data expressed in a first color system into image data in a preset RGB color system;

a program command to compress the image data in the preset RGB color system, so that a predetermined maximum color value and a predetermined minimum color value outside the predetermined color value range are respectively mapped to a maximum value and a minimum value in the predetermined color value range;

a program command to make the compressed image data subjected to the image processing;

a program command to expand the processed image data;

a program command to convert the expanded image data in the preset RGB color system into image data in the first color system; and a program command to output the converted image data in the first color system.

21. A computer readable medium that stores therein a program command assembly for image processing, said program command assembly comprising:

a program command to convert image data expressed in a first color system into image data in a preset RGB color system;

a program command to convert the image data in the preset RGB color system into image data in a wider RGB color system, which has a color range including color values inside and outside the color range of the preset RGB color system;

a program command to make the image data in the wider RGB color system subjected to image processing;

a program command to, in response to a storage request of the processed image data, convert the processed image data in the wider RGB color system into image data in the preset RGB color system;

a program command to convert the image data in the preset RGB color system into image data in the first color system; and a program command to output the converted image data in the first color system.

22. A method of making image data in a predetermined color value range subjected to image processing, said method comprising:

converting image data expressed in a first color system into image data in a preset RGB color system;

compressing the image data in the preset RGB color system, so that a maximum color value and a minimum color value among color values inside and outside the predetermined color value range are respectively mapped to a maximum value and a minimum value in the predetermined color value range;

making the compressed image data subjected to the image processing;

expanding the processed image data;

converting the expanded image data in the preset RGB color system into image data in the first color system; and outputting the converted image data in the first color system.

23. A method of making image data in a predetermined color value range subjected to image processing, a computer readable medium that stores therein a program, said method comprising:

converting image data expressed in a first color system into image data in a preset RGB color system;

compressing the image data in the preset RGB color system, so that a predetermined maximum color value and a predetermined minimum color value outside the predetermined color value range are respectively mapped to a maximum value and a minimum value in the predetermined color value range;

making the compressed image data subjected to the image processing;

expanding the processed image data;

converting the expanded image data in the preset RGB color system into image data in the first color system; and outputting the converted image data in the first color system.

24. An image processing method, said method comprising:

converting image data expressed in a first color system into image data in a preset RGB color system;

converting the image data in the preset RGB color system into image data in a wider RGB color system, which has a color range including color values inside and outside the color range of the preset RGB color system;

making the image data in the wider RGB color system subjected to image processing;

in response to a storage request of the processed image data, converting the processed image data in the wider RGB color system into image data in the preset RGB color system;

converting the image data in the preset RGB color system into image data in the first color system; and outputting the converted image data in the first color system.

* * * * *